(12) United States Patent
Fukuda et al.

(10) Patent No.: US 7,550,025 B2
(45) Date of Patent: *Jun. 23, 2009

(54) HONEYCOMB FILTER FOR CLARIFYING EXHAUST GAS AND METHOD FOR MANUFACTURE THEREOF

(75) Inventors: Tsutomu Fukuda, Kakogawa (JP); Masahiro Fukuda, Uji (JP); Masaaki Fukuda, Kakogawa (JP); Toshinobu Yoko, Uji (JP); Masahide Takahashi, Uji (JP)

(73) Assignee: Ohcera Co., Ltd., Osaka-shi (JP)

( * ) Notice: Subject to any disclaimer, the term of this patent is extended or adjusted under 35 U.S.C. 154(b) by 521 days.

This patent is subject to a terminal disclaimer.

(21) Appl. No.: 10/568,972

(22) PCT Filed: Aug. 20, 2004

(86) PCT No.: PCT/JP2004/012312

§ 371 (c)(1),
(2), (4) Date: Feb. 22, 2006

(87) PCT Pub. No.: WO2005/018776

PCT Pub. Date: Mar. 3, 2005

(65) Prior Publication Data

US 2007/0163219 A1    Jul. 19, 2007

(30) Foreign Application Priority Data

Aug. 22, 2003    (JP)    ............... 2003-208356

(51) Int. Cl.
*B01D 39/20* (2006.01)
*B01D 46/00* (2006.01)
*F01N 3/022* (2006.01)

(52) U.S. Cl. .............. 55/523; 55/282.3; 55/385.3; 55/524; 55/DIG. 5; 55/DIG. 10; 55/DIG. 30; 60/303; 60/311; 264/628; 264/630; 264/DIG. 48; 428/116

(58) Field of Classification Search ............ 55/282.2, 55/282.3, 385.3, 523, 524, DIG. 5, DIG. 10, 55/DIG. 30; 60/297, 303, 311; 264/628, 264/630, 631, DIG. 48; 501/134, 136; 428/116, 428/117, 118

See application file for complete search history.

(56) References Cited

U.S. PATENT DOCUMENTS 4,307,198 A * 12/1981 Oda et al. ............ 55/523

(Continued)

FOREIGN PATENT DOCUMENTS

EP    0 335 681 A2    10/1989

(Continued)

OTHER PUBLICATIONS

U.S. Appl. No. 10/568,972, filed Feb. 22, 2006, Fukuda et al.

(Continued)

*Primary Examiner*—Jason M Greene
(74) *Attorney, Agent, or Firm*—Oblon, Spivak, McClelland, Maier & Neustadt, P.C.

(57) ABSTRACT

Provided is a honeycomb filter which includes an aluminum titanate sintered product obtained by a process involving firing at a temperature of 1,250-1,700° C. a raw material mixture composed of: 100 wt. % of a first mixture having $TiO_2$ and $Al_2O_3$ in a molar ratio of 40-60/60-40; and 1-10 wt. % of a second mixture composed of: an alkali feldspar according to the formula $Na_yK_{1-y}AlSi_3O_8$, wherein $0 \leq y \leq 1$; and a component selected from an oxide having a spinel structure composed of Mg and/or MgO, MgO and a precursor compound composed of Mg that is converted to MgO by firing, wherein the honeycomb filter exhibits excellent properties with respect to mechanical strength, thermal decomposition resistance, thermal shock resistance and thermal stability at high and fluctuating temperatures. Also provided is a method and an apparatus for cleaning an exhaust gas by removing solid particles predominantly containing carbon from the exhaust gas with the honeycomb filter. Also provided is a process for producing the honeycomb filter.

20 Claims, 2 Drawing Sheets

U.S. PATENT DOCUMENTS

| | | | |
|---|---|---|---|
| 5,322,537 A | 6/1994 | Nakamura et al. | |
| 5,846,276 A * | 12/1998 | Nagai et al. | 55/523 |
| 7,001,861 B2 * | 2/2006 | Beall et al. | 55/523 |
| 7,011,788 B2 | 3/2006 | Fukuda et al. | |
| 7,148,168 B2 * | 12/2006 | Fukuda et al. | 501/134 |
| 7,166,552 B2 * | 1/2007 | Fukuda et al. | 501/136 |
| 7,259,120 B2 * | 8/2007 | Ellison et al. | 55/523 |
| 2003/0015829 A1 | 1/2003 | Fukuda et al. | |
| 2005/0181929 A1 | 8/2005 | Fukuda et al. | |
| 2006/0009347 A1 | 1/2006 | Fukuda et al. | |

FOREIGN PATENT DOCUMENTS

| | | |
|---|---|---|
| EP | 0 724 126 A2 | 7/1996 |
| EP | 0 873 775 A1 | 10/1998 |
| JP | 57-35918 | 2/1982 |
| JP | 5-214922 | 8/1993 |
| JP | 5-306614 | 11/1993 |
| JP | 8-290963 | 11/1996 |
| JP | 9-10527 | 1/1997 |
| JP | 9-29024 | 2/1997 |
| JP | 01/37971 | 5/2001 |
| WO | 01/37971 | 5/2001 |

OTHER PUBLICATIONS

U.S. Appl. No. 10/566,270, filed Jan. 30, 2006, Fukuda et al.
U.S. Appl. No. 10/559,337, filed Dec. 5, 2005, Fukuda et al.

* cited by examiner

HONEYCOMB FILTER FOR CLARIFYING EXHAUST GAS AND METHOD FOR MANUFACTURE THEREOF

CROSS-REFERENCE TO RELATED APPLICATIONS

The present application is a 35 U.S.C. § 371 National Stage patent application of International patent application PCT/JP04/012312, filed on Aug. 20, 2004, which claims priority to Japanese patent application JP 2003-208356, filed on Aug. 22, 2003.

TECHNICAL FIELD

The present invention relates to a honeycomb filter for cleaning an exhaust gas, to capture and remove fine solid particles (particulates) containing carbon as the main component, contained in an exhaust gas from e.g. a Diesel engine, and a process for its production.

BACKGROUND ART

In an exhaust gas from e.g. a Diesel engine of e.g. an automobile, particulates containing carbon as the main component are contained in a substantial concentration (from 150 to 250 mg/Nm$^3$) and thus cause an environmental problem together with nitrogen oxides, etc. Accordingly, it is desired to remove them efficiently and economically. Heretofore, various filters have been proposed to capture and remove such fine solid particles contained in exhaust gases.

For example, JP-A-57-35918 or JP-A-5-214922 discloses an exhaust gas filter wherein a plurality of channels in a honeycomb filter are alternately plugged at the upstream end or the downstream end. A honeycomb filter of this type has a structure such that a combustion exhaust gas to be cleaned, is supplied to openings on the upstream side of the filter and permitted to pass through partition walls of the filter, so that particulates in the exhaust gas are captured and removed by partition walls, and then, the exhaust gas after cleaning is taken out from openings at the downstream side of the filter.

On the other hand, the material for such a honeycomb filter is required to have not only high heat resistance but also a small thermal expansion coefficient and high thermal shock resistance, since it is exposed to a rapidly heated or cooled environment, and accordingly, silicon carbide or cordierite material has been proposed and practically used. However, such a material still has no adequate properties as an exhaust gas filter.

Namely, with an exhaust gas filter, it is likely that when captured non-combustion carbonaceous fine solid particles are abnormally deposited, such carbon will catch-fire and burn, whereby an abrupt temperature rise will take place so that the temperature locally reaches from 1,400 to 1,500° C. In such a case, a filter made of silicon carbide material will have a temperature distribution at various places of the filter, and the thermal expansion coefficient is about $4.2 \times 10^{-6} K^{-1}$ i.e. not so small, whereby cracks are likely to form by the thermal stress or thermal shock exerted to the material, thus leading to partial breakage. On the other hand, in the case of a filter made of cordierite material, the thermal expansion coefficient is small at a level of from 0.6 to $1.2 \times 10^{-6} K^{-1}$, whereby the problem of cracks due to thermal shock is less, but the melting point is not so high at a level of from 1,400 to 1,450° C., whereby a problem of partial melting due to the above-mentioned abnormal combustion of carbon becomes serious.

Once defects are formed in the interior of an exhaust gas filter by the breakage or melting of the filter as described above, the efficiency of the filter for capturing carbon decreases, and at the same time, the pressure of the exhaust gas exerted to the filter will be an excessive load to the defective portions and thus induce new breakage. Consequently, the entire exhaust gas filter will fail to function.

As the material for such a honeycomb filter, WO01/037971 proposes aluminum titanate as well as silicon carbonate or cordierite. Aluminum titanate is a material having heat resistance at a high temperature exceeding 1,700° C. and a small thermal expansion coefficient and excellent thermal shock resistance. However, on the other hand, aluminum titanate has a serious problem that since it has a decomposition region usually within a temperature range of from 800 to 1,280° C., it can not be used with stability within a fluctuated temperature region containing such a temperature range. Further, it has a difficulty such that since the anisotropy of its crystal structure is substantial, slippage by a thermal stress is likely to take place, and the mechanical strength is not high enough. Accordingly, it still has had a problem in its use for the production of a honeycomb having a thin wall thickness and a high cell density or in its use as an exhaust gas filter to be subjected to a load such as mechanical vibration at a high temperature, as mounted on an automobile or the like.

DISCLOSURE OF THE INVENTION

It is an object of the present invention to provide a honeycomb filter for cleaning an exhaust gas, which is excellent in heat resistance, has a small thermal expansion coefficient and excellent thermal shock resistance, is free from thermal decomposition even at a high and fluctuating temperature and has high mechanical strength so that it can be used with stability for a long period of time and which is capable of capturing and removing, with high efficiency, particulates such as fine carbon particles contained in an exhaust gas from e.g. a Diesel engine, and a process for its production.

As a result of an extensive study to solve the above-mentioned problems, the present invention has been accomplished by paying attention to aluminum titanate, on the basis of a discovery such that a honeycomb filter for cleaning exhaust gas, employing an aluminum titanate sintered product obtainable by firing a mixture having a specific alkali feldspar, an oxide having a spinel structure containing Mg, or MgO or an Mg-containing compound to be converted to MgO by firing, added in a prescribed ratio to a mixture comprising TiO$_2$ and Al$_2$O$_3$ in a prescribed ratio to form aluminum titanate, has high mechanical strength and thermal decomposition resistance, as different from conventional aluminum titanate sintered products, while maintaining the excellent heat resistance and high thermal shock resistance due to the small thermal expansion coefficient as inherent properties of conventional aluminum titanate sintered products.

Thus, the present invention provides the following:
(1) A honeycomb filter for cleaning an exhaust gas which is a honeycomb filter for removing solid particles containing carbon as their main component in an exhaust gas, characterized in that the material for the honeycomb filter is an aluminum titanate sintered product obtained by firing at from 1,250 to 1,700° C. a raw material mixture comprising:
 100 parts by mass of a mixture (component X) comprising TiO$_2$ and Al$_2$O$_3$ in a molar ratio of the former/the latter being 40 to 60/60 to 40, and
 from 1 to 10 parts by mass of an alkali feldspar represented by the empirical formula (Na$_y$K$_{1-y}$)AlSi$_3$O$_8$ (wherein $0 \leq y \leq 1$), an oxide having a spinel structure containing Mg, or MgO or an Mg-containing compound which will be converted to MgO by firing (component Y).

(2) The honeycomb filter for cleaning an exhaust gas according to the above (1), wherein component Y is a mixture comprising the alkali feldspar represented by $(Na_yK_{1-y})AlSi_3O_8$ (wherein $0 \leqq y \leqq 1$), and the oxide of a spinel structure containing Mg and/or MgO or the Mg-containing compound which will be converted to MgO by firing.

(3) The honeycomb filter for cleaning an exhaust gas according to the above (1), wherein the honeycomb filter has a wall thickness of from 0.1 to 0.6 mm and a cell density of from 15 to 93 cells/cm$^2$, wherein the porosity of the partition wall is from 30 to 70%, and the thermal expansion coefficient is at most $3.0 \times 10^{-6} K^{-1}$.

(4) A process for producing a honeycomb filter for cleaning an exhaust gas, characterized by preparing a mixture comprising:

100 parts by mass of a mixture (component X) comprising $TiO_2$ and $Al_2O_3$ in a molar ratio of the former/the latter being 40 to 60/60 to 40, and from 1 to 10 parts by mass of an alkali feldspar represented by the empirical formula $(Na_yK_{1-y})AlSi_3O_8$ (wherein $0 \leqq y \leqq 1$), an oxide having a spinel structure containing Mg, or MgO or an Mg-containing compound which will be converted to MgO by firing (component Y), adding a molding assistant to the mixture, followed by kneading to plasticize the mixture to make it extrusion-processable, extrusion processing it into a honeycomb structure, followed by firing at from 1,250 to 1,700° C.

(5) The process for producing a honeycomb filter for cleaning an exhaust gas according to the above (4), wherein component Y is a mixture comprising the alkali feldspar represented by $(Na_yK_{1-y})AlSi_3O_8$ (wherein $0 \leqq y \leqq 1$), and the oxide of a spinel structure containing Mg and/or MgO or the Mg-containing compound which will be converted to MgO by firing.

(6) An apparatus for cleaning an exhaust gas, characterized in that the honeycomb filter for cleaning an exhaust gas as defined in any one of the above (1) to (3) is accommodated in a can.

(7) The apparatus for cleaning an exhaust gas according to the above (6), which is used for cleaning an exhaust gas of an automobile having a diesel engine mounted.

The reason as to why the honeycomb filter made of the aluminum titanate sintered product according to the present invention, has high thermal decomposition resistance and high mechanical strength while maintaining the inherent high heat resistance, small thermal expansion coefficient and excellent thermal shock resistance as described above, is not clearly understood, but may probably be as follows.

Namely, by the addition of the alkali feldspar to the mixture to form aluminum titanate, the reaction to form alumina titanate takes place in a liquid phase, since the alkali feldspar is present which becomes a liquid phase in the vicinity of the temperature at which aluminum titanate will be formed, whereby dense crystals will be formed to improve the mechanical strength. And, the Si component contained in the alkali feldspar will be solid-solubilized in the crystal lattice of the aluminum titanate and will be substituted for Al. Si has a smaller ion radius than Al, whereby the bond distance from the surrounding oxygen atoms will be shortened, and the lattice constant tends to have a small value as compared with pure aluminum titanate. It is considered that as a result, the sintered product thus obtained shows a very high thermal stability as the crystal structure is stabilized, and the thermal decomposition resistance is substantially improved.

Further, in a case where an oxide having a spinel structure containing Mg, or MgO or an Mg-containing compound which will be converted to MgO by firing, is added to the mixture to form aluminum titanate, it is possible to obtain a dense sintered product and to form a sintered product having a very high mechanical strength as compared with pure aluminum titanate.

Further, in a case where the alkali feldspar, and the oxide having a spinel structure and/or MgO or the Mg-containing compound which will be converted to MgO by firing, are simultaneously added to the mixture to form an aluminum titanate, Si contained in the alkali feldspar and Mg contained in the oxide of the spinel structure and/or MgO or the Mg-containing compound which will be converted to MgO by firing, will be substituted mainly at Al sites in the aluminum titanate. If these elements are added alone, a bivalent (Mg) or tetravalent (Si) element would be substituted at Al sites where the balance of electric charge is maintained with trivalency. Accordingly, in order for the sintered product to maintain the balance of electric charge, it is considered that when Mg is added, oxygen is discharged out of the system to create oxygen deficiency to maintain the balance of electric charge, and when Si is added, since Si is tetravalent, the tetravalent Ti will be reduced to trivalent to take the balance of electric charge.

On the other hand, Mg is smaller by 1 in the electric charge than Al, and Si is larger by 1 in the electric charge than Al. Thus, it is considered possible to take the balance of electric charge by simultaneously adding the alkali feldspar and the oxide having a spinel structure and/or MgO or the Mg-containing compound which will be converted to MgO by firing, and it will be possible to solid-solubilize them without presenting an influence over other elements constituting the sintered product.

It is considered that especially when the alkali feldspar, and the oxide of spinel structure and/or MgO or the Mg-containing compound which will be converted to MgO by firing, are added in a ratio close to an equimolar ratio, the additives can be present more stably as compared with a case where they are added alone. It is considered that for these reasons, both act synergistically to substantially improve the strength as compared with a case where they are used alone, and it is possible to form an aluminum titanate sintered product which has a high mechanical strength without impairing the low thermal expansion property inherent to aluminum titanate and which at the same time has improved thermal decomposition resistance.

MEANING OF SYMBOLS

Figure 1:
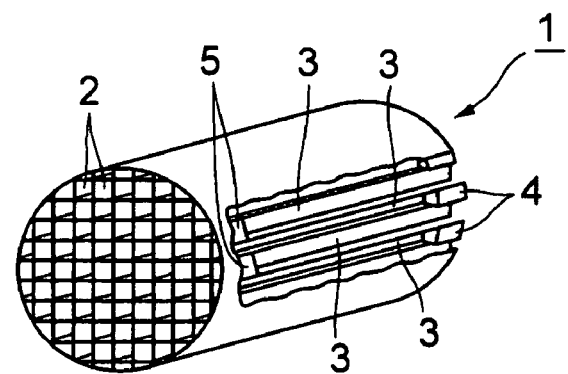
FIG. 1 is a perspective view showing an embodiment of a honeycomb filter for cleaning an exhaust gas of the present invention, as partly cut off.

1: honeycomb filter 2: partition wall
3: through-hole 4,5: blockers

BEST MODE FOR CARRYING OUT THE INVENTION

In the present invention, as the material for a honeycomb filter, an aluminum titanate sintered product is used which is obtained by firing from 1,250 to 1,700° C. a raw material mixture comprising 100 parts by mass of component X comprising $TiO_2$ and $Al_2O_3$ in a molar ratio of the former/the latter being 40 to 60/60 to 40, and from 1 to 10 parts by mass of component Y.

The above $TiO_2$ and $Al_2O_3$ to form aluminum titanate may not necessarily be pure $TiO_2$ and $Al_2O_3$, respectively, and they are not particularly limited so long as they are components capable of forming aluminum titanate by firing. Usually, they are suitably selected for use among those employed as raw materials for various ceramics, such as alumina ceramics, titania ceramics and aluminum titanate ceramics. For example, double oxides, carbonates, nitrates or sulfates containing Al and Ti as metal components may also be used.

$TiO_2$ and $Al_2O_3$ are used in a molar ratio of the former/latter being 40 to 60/60 to 40, preferably 45 to 50/55 to 60. It is possible to avoid the eutectic point of the fired product especially by adjusting the molar ratio of $Al_2O_3/TiO_2$ to be at least 1 within the above range. In the present invention, $Al_2O_3$ and $TiO_2$ are used as a mixture, and in this invention, such a mixture may sometimes be referred to as component X.

In the case of the honeycomb filter of the present invention, it is necessary to add component Y as an additive to the above component X. As the alkali feldspar as one of component Y, one represented by the empirical formula $(Na_yK_{1-y})AlSi_3O_8$ may be used. In the formula, y satisfies $0 \leq y \leq 1$, preferably $0.1 \leq y \leq 1$, particularly preferably $0.15 \leq y \leq 0.85$. The alkali feldspar having value y within this range has a low melting point and is particularly effective for acceleration of the sintering of aluminum titanate.

As the oxide having a spinel structure containing Mg as another component Y, $MgAl_2O_4$ or $MgTi_2O_4$ may, for example, be used. Such an oxide having a spinel structure may be a natural mineral, or a material containing MgO and $Al_2O_3$, a material containing MgO and $TiO_2$, or a spinel-form oxide obtained by firing such a material. Further, two or more oxides having different types of spinel structures may be used in combination as a mixture. Further, as a MgO precursor, any material may be used so long as it is capable of forming MgO by firing, and for example, $MgCO_3$, $Mg(NO_3)_2$, $MgSO_4$ or a mixture thereof may be mentioned.

The ratio of the above components X and Y is important, and component Y is from 1 to 10 parts by mass per 100 parts by mass of component X. This is a ratio where components X and Y are oxides respectively, and when raw materials other than oxides are used, values calculated as oxides will be employed. If component Y is smaller than 1 part by mass per 100 parts by mass of component X, the effect for improving the properties of the sintered product by the effect of addition of component Y, will be small. On the other hand, if it exceeds 10 parts by mass, such will exceeds the solid-solubilization limit of the Si or Mg element in the aluminum titanate crystals, and the excess component added in excess will be present in an independent oxide in the sintered product and tends to increase the thermal expansion coefficient, such being undesirable. It is particularly preferred that component Y is from 3 to 7 parts by mass per 100 parts by mass of component X.

Further, in the present invention, it is preferred that as the above component Y, the alkali feldspar represented by the empirical formula $(Na_yL_{1-y})AlSi_3O_8$, and the oxide having a spinel structure containing Mg and/or MgO or its precursor, are used in combination as a mixture. When such a mixture is used, the above mentioned synergistic functional improvement can be obtained. The mixture of the above feldspar (former), and the oxide having a spinel structure containing Mg and/or MgO or its precursor (latter) preferably has a mass ratio of the former/the latter being 20 to 60/80 to 40, particularly preferably 35 to 45/65 to 55. In the above range, the ratio of Si/Mg will be equimolar, and if the ratio is not within this range, the synergistic effect by the simultaneous solid-solubilization of Si and Mg in aluminum titanate tends to be hardly obtainable, such being undesirable.

In the present invention, in addition to the above components X and Y, other sintering assistants may be employed as the case requires, whereby the nature of the obtainable sintered product can be improved. As such other sintering assistants, $SiO_2$, $ZrO_2$, $Fe_2O_3$, CaO and $Y_2O_3$ may, for example, be mentioned.

The raw material mixture comprising the above components X and Y, is sufficiently mixed and pulverized. The mixing and pulverization of the raw material mixture is not particularly limited and may be carried out by a known method. For example, they may be carried out by means of e.g. a ball mill or a medium-agitation mill. The degree of pulverization of the raw material mixture is not particularly limited, but the average particle size is preferably at most 30 μm, particularly preferably from 8 to 15 μm. The average particle size should better be small so long as it is within a range where no secondary particles will be formed.

Molding assistants may preferably be incorporated to the raw material mixture. As such molding assistants, known agents such as a binder, a pore-forming agent, a release agent, a defoaming agent and a peptizer may be employed. As the binder, polyvinyl alcohol, microwax emulsion, methylcellulose or carboxymethylcellulose may, for example, be preferred. As the pore-forming agent, activated carbon, coke, a polyethylene resin, starch or graphite may, for example, be preferred. As the release agent, a stearic acid emulsion may, for example, be preferred; as the defoaming agent, n-octyl alcohol or octylphenoxyethanol may, for example, be preferred; and as the peptizer, diethylamine or triethylamine may, for example, be preferred.

The amounts of the molding assistants are not particularly limited. However, in the case of the present invention, they are preferably within the following ranges, respectively, as calculated as solid contents, per 100 parts by mass of the total amount of components X and Y (as calculated as the respective oxides) to be used as the starting materials. Namely, it is preferred to use the binder in an amount of from about 0.2 to 0.6 part by mass, the pore-forming agent in an amount of from about 40 to 60 parts by mass, the release agent in an amount of from about 0.2 to 0.7 part by mass, the defoaming agent in an amount of from about 0.5 to 1.5 parts by mass and the peptizer in an amount of from about 0.5 to 1.5 parts by mass.

The raw material mixture having such molding assistants incorporated, is mixed, kneaded and plasticized so that it is extrusion-processable, followed by extrusion processing to form a honeycomb structure. As the method for extrusion, a known method may be used, and the shape of each cell of the honeycomb may be circular, oval, tetragonal or triangular. Further, the entire configuration of the honeycomb molded product may be either cylindrical or square tubular. The molded honeycomb body is preferably dried and then fired at from 1,250 to 1,700° C., preferably from 1,300 to 1,450° C.

The firing atmosphere is not particularly limited and is preferably an oxygen-containing atmosphere such as in the air which is commonly employed. The firing time is not particularly limited so long as the firing can be done until the sintering proceeds sufficiently, and it is usually at a level of from 1 to 20 hours.

Also with respect to the temperature raising rate or the temperature lowering rate at the time of the above firing, there is no particular restriction, and such conditions may be suitably set so that no cracks will be, formed in the obtainable sintered product. For example, it is preferred to gradually raise the temperature without rapid rise of the temperature to sufficiently remove the molding assistants such as moisture, a binder, etc. contained in the raw material mixture. Further, if necessary, prior to heating at the above-mentioned firing temperature, presintering may be carried out preferably within a temperature range of from 500 to 1,000° C. for from 10 to 30 hours by mild temperature raise, whereby the stress in the sintered product which causes cracking during the formation of aluminum titanate, can be relaxed, and formation of cracks in the sintered product can be suppressed to obtain a uniform sintered product.

The sintered product thus obtainable will be one having, as the basic component, aluminum titanate formed from component X and having a Si component contained in the alkali feldspar and the Mg component derived from the oxide having a spinel structure containing Mg, MgO or the Mg-containing compound which will be converted to MgO by firing, as component Y, solid-solubilized in the crystal lattice of the aluminum titanate. Such a sintered product has high mechanical strength and a low thermal expansion coefficient and yet has a crystal structure stabilized, as mentioned above, and will thus be a sintered product having excellent heat decomposition resistance.

As a result, a honeycomb filter made of such a sintered product has a thin wall honeycomb structure having a wall thickness of e.g. from 0.1 to 0.6 mm, preferably from 0.3 to 0.48 mm and a cell density of e.g. from 15 to 93 cells/cm$^2$. And, the porosity of the partition wall is, for example, from 30 to 70%, preferably from 40 to 60%, and the thermal expansion coefficient is e.g. at most $3.0 \times 10^{-6} K^{-1}$, preferably at most $1.5 \times 10^{-6} K^{-1}$. Such a honeycomb filter can be used with stability, from room temperature to 1,600° C. as the thermal decomposition reaction of aluminum titanate is suppressed even at a high temperature.

Figure 2:
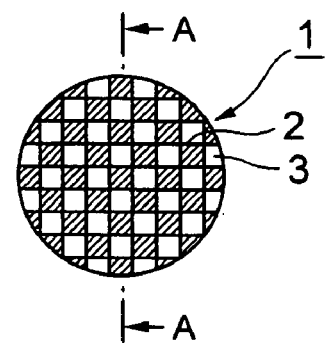
FIG. 2 is a diagrammatical view showing the end face of the honeycomb filter in FIG. 1.
Figure 3:
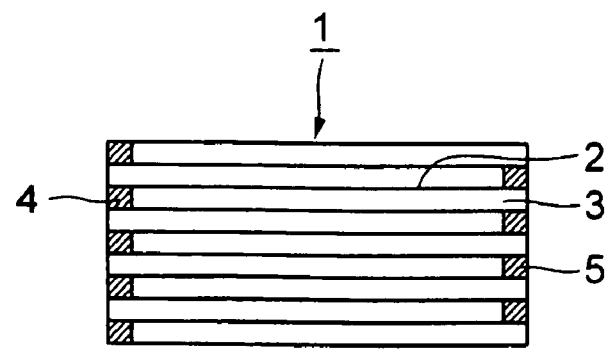
FIG. 3 is a cross-sectional diagrammatical view along line A-A of the honeycomb filter in FIG. 2.

FIG. 1 is a perspective view of an embodiment of the honeycomb filter for cleaning an exhaust gas of the present invention. FIG. 2 is a diagrammatical view showing the end face of the honeycomb filter in Example 1. FIG. 3 is a diagrammatical view of the cross-section along line A-A of the honeycomb filter in FIG. 2. In these Figs., the honeycomb filter 1 for cleaning an exhaust gas has both ends alternately plugged by blockers 4 and 5 at the upstream side and at the downstream side of a honeycomb filter comprising through-holes 3 constituted by many partition walls 2. Namely, as shown in FIG. 2, at the upstream or downstream side end, the through-holes 3 are plugged with blockers 4 or 5 in a lattice form, and with respect to each through-hole 3, either the upstream or downstream side end is plugged with a blocker 4 or 5. To such a honeycomb body, an exhaust gas to be cleaned is supplied to through-holes 3 on the upstream side of the honeycomb body and passed through the partition walls 2 to have particulates in the exhaust gas captured and removed by the partition walls 2, and then, the exhaust gas after the cleaning is taken out from the through-holes 3 on the downstream side.

The honeycomb product of the present invention formed as a honeycomb filter for cleaning exhaust gas is preferably set in a can body by means of a suitable supporting material and is used to capture and remove fine solid particles (particulates) containing carbon as the main component, contained in an exhaust gas. With respect to the type of the exhaust gas, any gas discharged from a combustion source of either a stationary body or a mobile body may be treated. However, as mentioned above, the honeycomb filter is particularly useful for cleaning an exhaust gas from an automobile having a Diesel engine mounted where the severest properties are required.

EXAMPLES

Now, the present invention will be described in further detail with reference to Examples. However, it should be understood that the present invention is by no means thereby restricted.

Example 1

To 100 parts by mass of a mixture comprising 56.1 mass % (50 mol %) of easily sinterable α-alumina and 43.9 mass % (50 mol %) of anatase-type titanium oxide, 4 parts by mass of an alkali feldspar represented by $(Na_{0.6}K_{0.4})AlSi_3O_8$, 0.25 parts by mass of polyvinyl alcohol as a binder, 1 part by mass of diethylamine as a peptizer, 0.5 part by mass of polypropylene glycol as a defoaming agent, and 50 parts by mass of activated carbon having a particle size of from 50 to 80 μm as a pore-forming agent, were added, mixed for 3 hours in a ball mill and then dried in a dryer at a temperature of 120° C. for at least 12 hours to obtain a raw material powder.

The obtained raw material powder was pulverized to an average particle size of at most 10 μm and formed by a vacuum forming machine (manufactured by Miyazaki Iron Works Co., Ltd.) to obtain a honeycomb formed product. This formed product was dried and then fired in the atmosphere at 1,500° C. for 2 hours and then left to cool, to obtain a totally cylindrical honeycomb filter having cross-sectionally square cells, as shown in FIGS. 1 to 3. The honeycomb filter had a wall thickness of 0.38 mm and a cell density of 31 cells/cm$^2$, and the outer diameter of the cylinder was 144 mm and the length was 152 mm.

Comparative Example 1

A honeycomb filter made of an aluminum titanate sintered product, was obtained in the same manner as in Example 1 except that no alkali feldspar was used.

Example 2

To 100 parts by mass of a mixture comprising 56.1 mass % (50 mol %) of easily sinterable α-alumina and 43.9 mass % (50 mol %) of anatase-type titanium oxide, 4 parts by mass of an alkali feldspar represented by $(Nao_{0.6}K_{0.4})AlSi_3O_8$, 6 parts by mass of a spinel compound represented by a chemical formula $MgAl2O_4$, 0.25 part by mass of polyvinyl alcohol as a binder, 1 part by mass of diethylamine as a peptizer, 0.5 part by mass of polypropylene glycol as a defoaming agent, and 50 parts by mass of activated carbon having a particle size of from 50 to 80 μm as a pore-forming agent, were added and mixed for 3 hours in a ball mill and then dried in a dryer at 120° C. for at least 12 hours to obtain a raw material powder.

Using the obtained raw material powder, pulverization, forming, drying and firing were carried out in the same manner as in Example 1 to obtain a honeycomb filter.

Example 3

To 100 parts by mass of a mixture comprising 56.1 mass % (50 mol %) of easily sinterable α-alumina and 43.9 mass % (50 mol %) of anatase-type titanium oxide, 6 parts by mass of a spinel compound represented by a chemical formula $MgAl_2O_4$ as an additive, 0.25 part by mass of polyvinyl alcohol as a binder, 1 part by mass of diethylamine as a peptizer, 0.5 part by mass of polypropylene glycol as a defoaming agent, and 50 parts by mass of activated carbon having a particle size of from 50 to 80 μm as a pore-forming agent, were added and mixed for 3 hours in a ball mill and then dried in a dryer at 120° C. for at least 12 hours to obtain a raw material powder.

Using the obtained raw material powder, pulverization, forming, drying and firing were carried out in the same manner as in Example 1 to obtain a honeycomb filter.

Comparative Examples 2 and 3

As materials for honeycomb filters, commercially available silicon carbide powder (tradename: SHOCERAM, manufactured by SHOWA DENKO K.K.) and cordierite powder ($2MgO.2Al_2O_3.5SiO_2$) were respectively used, and from these materials, honeycomb filters were obtained by carrying out the conventional methods respectively. Here, the honeycomb made of silicon carbide will be referred to as Comparative Example 2, and the honeycomb made of cordierite as Comparative Example 3.

Property Tests with Respect to Honeycomb Sintered Products

With respect to the honeycomb filters obtained in the above Examples 1, 2 and 3 and Comparative Examples 1, 2 and 3, the porosity (%), the thermal expansion coefficient ($\times 10^{-6}$ $K^{-1}$) at from room temperature to 800° C., the thermal shock resistance (° C.) by an in-water dropping method, the softening temperature (° C.) and the compression strength (MPa) were measured, and the results are shown in Table 1. Here, the porosity was measured by a method in accordance with JIS R1634, the thermal expansion coefficient by a method in accordance with JIS R1618, the thermal shock resistance by a method in accordance with JIS R1648, the softening temperature by a method in accordance with JIS R2209, and the compression strength by a method in accordance with JIS R1608. Further, with respect to the compression strength, from each honeycomb filter, a square test specimen having cross-sectionally 5×5 cells and a length of 15 mm, was cut out, and this specimen was measured from three directions i.e. (A) in the lengthwise axial direction (axial), (B) in the vertical direction (tangential) and (C) in the direction inclined by 45° from the lengthwise axis (diagonal).

TABLE 1

| | Porosity (%) | Thermal expansion coefficient ($\times 10^{-6}$ $K^{-1}$) | Thermal shock resistance (° C.) | Softening temperature (° C.) | Compression strength (MPa) | | |
|---|---|---|---|---|---|---|---|
| | | | | | (A) | (B) | (C) |
| Example 1 | 48 | 1.2 | 950 | 1670 | >5.0 | >2.5 | >1.2 |
| Example 2 | 53 | 1.5 | 880 | 1620 | >8.3 | >5.1 | >1.0 |
| Example 3 | 51 | 0.9 | 1220 | 1680 | >4.1 | >1.9 | >1.0 |
| Comparative Example 1 | 41 | 0.8 | 980 | 1680 | >0.4 | >0.1 | >0.1 |
| Comparative Example 2 | 42 | 4.0 | 400 | — | >6.0 | >5.0 | >1.5 |
| Comparative Example 3 | 45 | 0.6 | 650 | 1320 | >10 | >1.3 | >0.2 |

As is evident from Table 1, each of the honeycombs in Examples 1, 2 and 3 and Comparative Examples 2 and 3, has a porosity within a range of from 40 to 60% and a high compression strength sufficient for mounting. Comparative Example 1 is inadequate for mounting. However, it is evident that each of the honeycombs in Examples 1, 2 and 3 has a thermal expansion coefficient very much smaller than that in Comparative Example 2 and has a softening temperature very much higher than that in Comparative Example 3. Further, it is evident that with respect to the thermal shock resistance, each of the honeycomb sintered products in Example 1, 2 and 3 has a property very much higher than that in Comparative Example 2 or 3.

Thermal Decomposition ResitanceE Test

From each of the honeycomb filters in Examples 1 and 2 and Comparative Example 1, a test specimen of 10 mm×10 mm×10 mm was cut out and held in a high temperature atmosphere of 1,000° C., whereby the change with time of the remaining ratio β (%) of aluminum titanate was investigated to carry out a thermal decomposition resistance test.

Here, the remaining ratio of aluminum titanate was obtained by the following method from the spectrum of the X-ray diffraction measurement (XRD).

Firstly, as $Al_2O_3$ (corundum) and $TiO_2$ (rutile) are formed when aluminum titanate undergoes thermal decomposition, using the integrated intensity ($I_{TiO2(110)}$) of the diffraction peak at the (110) face of rutile and the integrated intensity ($I_{AT(023)}$) of the diffraction peak at the (023) face of the aluminum titanate, the intensity ratio r of aluminum titanate to rutile was obtained by the following formula:

$$r = I_{AT(023)}/(I_{AT(023)} + I_{TiO2(110)})$$

Further, also with respect to the sintered product before carrying out the thermal treatment at 1,000° C., the intensity ratio $r_0$ of aluminum titanate to rutile was obtained in the same manner. Then, using r and $r_0$ obtained as described above, the remaining ratio β (%) of aluminum titanate was obtained by the following formula:

$$\beta = (r/r_0) \times 100$$

Figure 4:
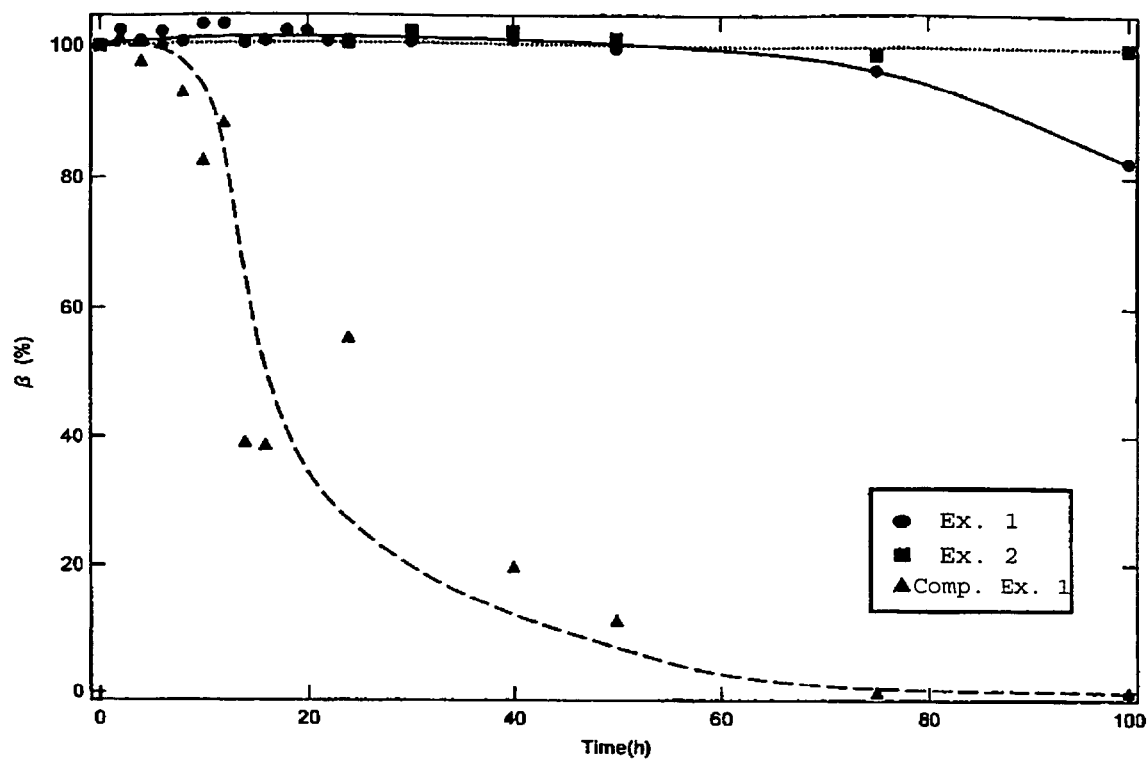
FIG. 4 shows the changes with time of the remaining ratios β of aluminum titanate with respect to the sintered products in Examples 1 and 2 and Comparative Example 2.

With respect to the respective honeycomb-shaped sintered products in Examples 1 and 2 and Comparative Example 1, the changes with time of the remaining ratios β of the respective crystals are shown by a graph in FIG. 4. As is evident from FIG. 4, Examples 1 and 2 are superior in the thermal decomposition resistance, as the remaining ratios are maintained at high levels over a long time, as compared with Comparative Example 1. Further, it is evident that while the remaining ratio in Example 1 after expiration of 50 hours in FIG. 4 is slightly low, the remaining ratio in Example 2 is still maintained at a high level and thus shows that the thermal decomposition resistance is further improved over Example 1.

INDUSTRIAL APPLICABILITY

The honeycomb filter material made of an aluminum titanate sintered product by the present invention, is excellent in heat resistance and has high heat decomposition resistance and high mechanical strength, while maintaining a small thermal expansion coefficient and heat shock resistance, and thus has substantially superior properties as compared with conventional filter materials. As a result, the honeycomb filter for exhaust gas of the present invention is useful to remove fine solid particles in an exhaust gas from a combustion source of either a stationary body or a mobile body. Especially, as mentioned above, it is most suitable for cleaning an exhaust gas from an automobile having a Diesel engine mounted, where the severest properties are demanded.

The invention claimed is:

1. A honeycomb filter comprising an aluminum titanate sintered product obtained by a process comprising firing at a temperature of 1,250-1,700° C. a raw material mixture comprising:
    100 wt. % of a first mixture comprising $TiO_2$ and $Al_2O_3$ in a molar ratio of 40-60/60-40; and
    1-10 wt. % of a second mixture comprising: an alkali feldspar according to the formula $(Na_yK_{1-y})AlSi_3O_8$, wherein $0 \leq y \leq 1$; and a component selected from the group consisting of an oxide having a spinel structure comprising Mg and/or MgO, MgO and a precursor compound comprising Mg that is converted to MgO by firing.

2. The honeycomb filter according to claim 1, wherein the second mixture is present in an amount of 3-7 wt. %.

3. The honeycomb filter according to claim 1, wherein $0.1 \leq y \leq 1$.

4. The honeycomb filter according to claim 1, wherein $0.15 \leq y \leq 0.85$.

5. The honeycomb filter according to claim 1, wherein the second mixture comprises the alkali feldspar and the component in a weight ratio of 20-60/80-40.

6. The honeycomb filter according to claim 1, wherein the second mixture comprises the alkali feldspar and the component in a weight ratio of 35-45/65-55.

7. The honeycomb filter according to claim 1, wherein the honeycomb filter has a wall thickness of 0.1-0.6 mm, a cell density of 15-93 cells/cm², a partition wall porosity of 30-70%, and a thermal expansion coefficient of at most $3.0 \times 10^{-6} K^{-1}$.

8. The honeycomb filter according to claim 1, wherein the honeycomb filter has a wall thickness of 0.3-0.48 mm, a cell density of 15-93 cells/cm², a partition wall porosity of 40-60%, and a thermal expansion coefficient of at most $1.5 \times 10^{-6} K^{-1}$.

9. The honeycomb filter according to claim 1, wherein the component is the oxide having a spinel structure comprising Mg and/or MgO and is selected from the group consisting of $MgAl_2O_4$, $MgTi_2O_4$ and mixtures thereof.

10. The honeycomb filter according to claim 1, wherein the component is MgO.

11. The honeycomb filter according to claim 1, wherein the component is the precursor compound comprising Mg that is converted to MgO by firing and is selected from the group consisting of $MgCO_3$, $Mg(NO_3)_2$, $MgSO_4$ and mixtures thereof.

12. The honeycomb filter according to claim 1, wherein the raw material mixture further comprises one or more agents selected from the group consisting of a sintering assistant, a binder, a pore-forming agent, a release agent, a defoaming agent and a peptizer.

13. The honeycomb filter according to claim 1, wherein the raw material mixture further comprises: at least one sintering assistant selected from the group consisting of $SiO_2$, $ZrO_2$, $Fe_2O_3$, CaO and $Y_2O_3$; 0.2-0.6 wt. % of at least one binder selected from the group consisting of polyvinyl alcohol, a microwax emulsion, methylcellulose and carboxymethylcellulose; 40-60 wt. % of at least one pore-forming agent selected from the group consisting of activated carbon, coke, a polyethylene resin, starch and graphite; 0.2-0.7 wt. % of a stearic acid emulsion release agent; 0.5-1.5 wt. % of at least one defoaming agent selected from the group consisting of n-octyl alcohol and octylphenoxyethanol; and 0.5-1.5 wt. % of at least one peptizer selected from the group consisting of diethylamine and triethylamine.

14. The honeycomb filter according to claim 1, wherein said firing is carried out at a temperature of 1,300-1,450° C. for a period of 1-20 hours.

15. The honeycomb filter according to claim 1, wherein the process further comprises, prior to said firing, pre-sintering the raw material mixture at a temperature of 500-1,000° C. for a period of 10-30 hours.

16. A method of cleaning an exhaust gas comprising removing solid particles predominantly comprising carbon from the exhaust gas with the honeycomb filter according to claim 1.

17. The method according to claim 16, wherein the exhaust gas is a diesel engine exhaust gas of an automobile.

18. An apparatus for cleaning an exhaust comprising the honeycomb filter according to claim 1.

19. The apparatus according to claim 18, wherein the exhaust gas is a diesel engine exhaust gas of an automobile.

20. A process for producing a honeycomb filter comprising an aluminum titanate sintered product, wherein the process comprises:
    preparing a raw material mixture comprising: 100 wt. % of a first mixture comprising $TiO_2$ and $Al_2O_3$ in a molar ratio of 40-60/60-40; and 1-10 wt. % of a second mixture comprising: an alkali feldspar according to the formula $(Na_yK_{1-y})AlSi_3O_8$, wherein $0 \leq y \leq 1$; and a component selected from the group consisting of an oxide having a spinel structure comprising Mg and/or MgO, MgO and a precursor compound comprising Mg that is converted to MgO by firing;
    adding to the raw material mixture one or more agents selected from the group consisting of a sintering assistant, a binder, a pore-forming agent, a release agent, a defoaming agent and a peptizer to produce a mixture;
    kneading and plasticizing the mixture;
    extruding the mixture into a honeycomb structure; and
    firing the honeycomb structure at a temperature of 1,250-1,700° C. to produce the honeycomb filter comprising an aluminum titanate sintered product.

* * * * *